(12) United States Patent
Chen (10) Patent No.: US 10,646,974 B2
(45) Date of Patent: May 12, 2020

(54) INDEXING DEVICE

(71) Applicant: Kuo Ming Chen, Taichung (TW)

(72) Inventor: Kuo Ming Chen, Taichung (TW)

(*) Notice: Subject to any disclaimer, the term of this patent is extended or adjusted under 35 U.S.C. 154(b) by 0 days.

(21) Appl. No.: 16/153,953

(22) Filed: Oct. 8, 2018

(65) Prior Publication Data

US 2019/0160620 A1 May 30, 2019

(30) Foreign Application Priority Data

Nov. 28, 2017 (TW) .............................. 106141410 A (51) Int. Cl.
*B23Q 16/02* (2006.01)
*B23Q 5/56* (2006.01)
*B23Q 16/06* (2006.01)

(52) U.S. Cl.
CPC .............. *B23Q 16/06* (2013.01); *B23Q 5/56* (2013.01); *B23Q 16/025* (2013.01); *B23Q 2220/004* (2013.01)

(58) Field of Classification Search
CPC .... B23Q 16/022; B23Q 16/025; B23Q 16/06; B23Q 16/065; B23Q 39/042; B23Q 2220/004; B23Q 5/56; F16H 53/06; F16H 53/08; F16H 57/12
See application file for complete search history.

(56) References Cited

U.S. PATENT DOCUMENTS

| | | | | |
|---|---|---|---|---|
| 3,049,017 A * | 8/1962 | McDonald | ............ | F16H 27/045 74/426 |
| 4,452,103 A * | 6/1984 | Lijewski | .............. | B23Q 16/025 74/567 |
| 6,862,786 B2 * | 3/2005 | Kato | ........................ | B23Q 1/38 29/38 B |
| 7,491,022 B2 * | 2/2009 | Kato | ...................... | B23Q 1/287 269/71 |
| 7,793,567 B2 * | 9/2010 | Kato | ...................... | B23Q 1/287 303/89 |
| 8,443,698 B2 * | 5/2013 | Cafuta | ................. | B23Q 16/025 74/813 R |

FOREIGN PATENT DOCUMENTS

| | | | | |
|---|---|---|---|---|
| DE | 102009004699 | A1 * | 7/2010 | ........... B23Q 16/025 |
| DE | 102016010092 | B3 * | 11/2017 | |
| EP | 0256960 | A1 * | 2/1988 | ............. B23Q 1/522 |

* cited by examiner

*Primary Examiner* — Adam D Rogers
(74) *Attorney, Agent, or Firm* — Alan D. Kamrath; Karin L. Williams; Mayer & Williams PC (57) ABSTRACT

The present invention provides an indexing device for a turntable which is provided with a plurality of roller followers arranged at equal angular intervals; a cam component is provided on one side of the turntable. The cam component is provided with a first side rib wall with a continuous cam curved surface in a first direction and a second side rib wall with a continuous cam curved surface in a second direction, and the first side rib wall and the second side rib wall face opposite sides to form a cam groove with a variable groove width for guiding the movements of the roller followers and rotating the turntable; wherein the first side rib wall and the second side rib wall can compress on at least one pair of the roller followers of the turntable symmetrically in the first and second directions, so as to effectively eliminate the backlash problem between the cam component and the roller followers and improve the positioning accuracy of the turntable.

5 Claims, 14 Drawing Sheets

INDEXING DEVICE

CROSS-REFERENCE TO RELATED APPLICATIONS

This Non-provisional application claims priority under 35 U.S.C. § 119(a) on Patent Application No. 106141410 filed in Taiwan, Republic of China, on Nov. 28, 2017, the entire contents of which are hereby incorporated by reference.

The present invention especially relates to an indexing device, which can eliminate the backlash between the cam component and the roller followers, to avoid the shock and the vibration so as to increase the positioning accuracy of the turntable.

BACKGROUND OF THE INVENTION

Figure 1:
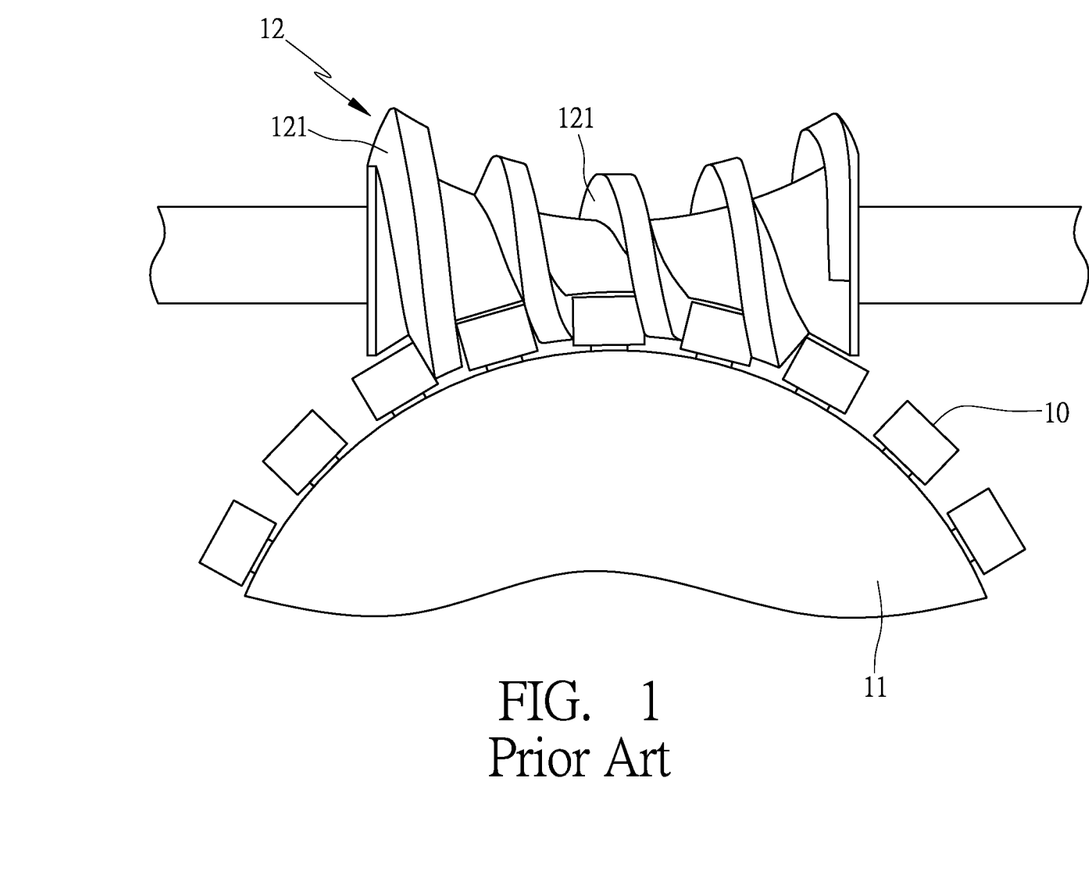
FIG. 1: Schematic diagram of the driving mode of the conventional roller gear cam.
Figure 2:
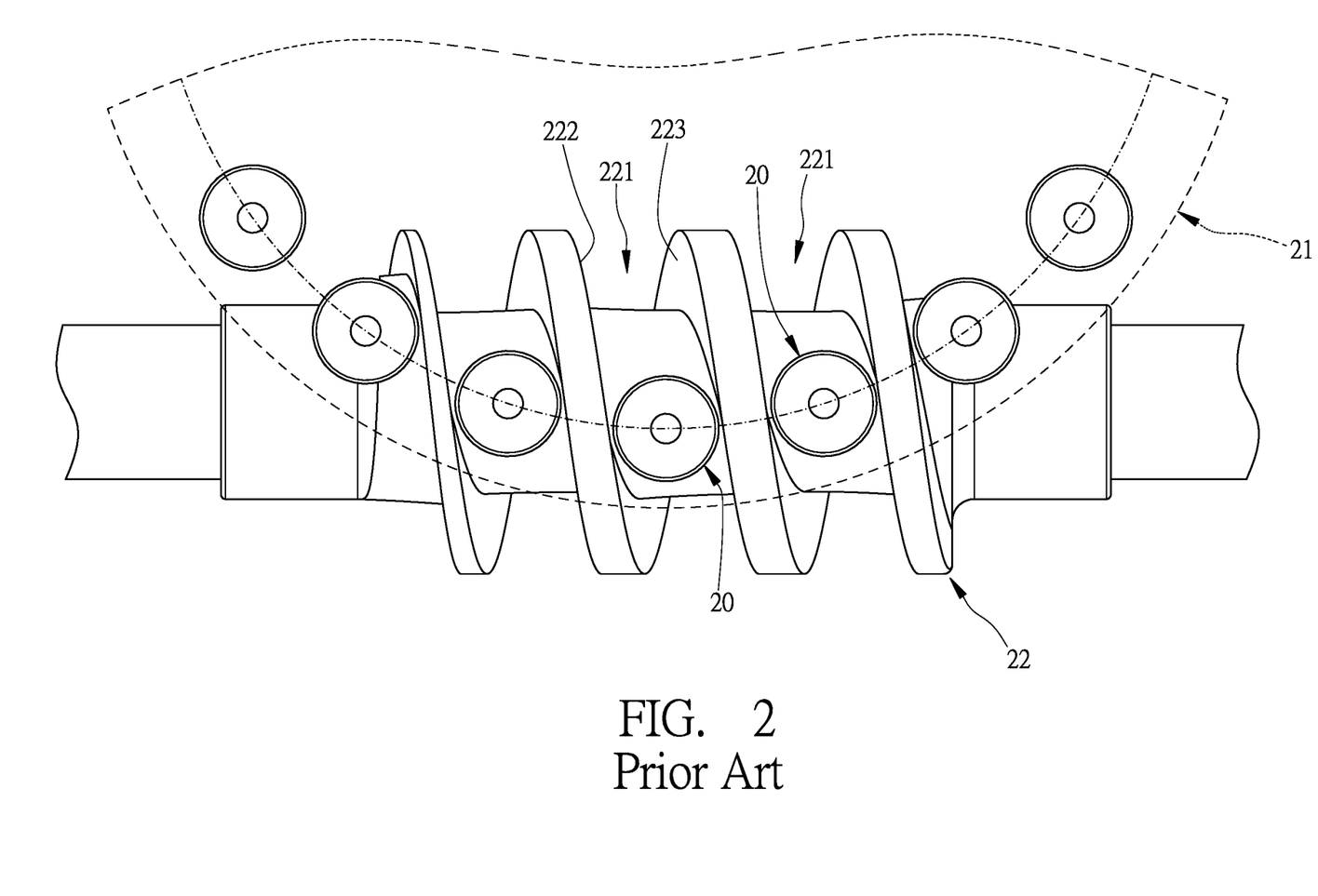
FIG. 2: Schematic diagram of the driving mode of the conventional barrel cam.

The roller type turntable is widely used in the indexing application of the machine tool, such as the indexing plate of the fourth axis or the cutter head of the tool magazine; in general, based on the position of the roller follower, the indexing driving mode of the roller type turntable can be divided into the driving mode of the roller gear cam and the driving mode of the barrel cam, so as to position the turntable in a preset position. Please refer to FIG. 1, which shows the driving mode of the roller gear cam, wherein the roller follower 10 is provided on the outer circumference of the turntable 11, and the central axis of each roller follower 10 is vertically radiated. The roller gear cam 12 drives the roller follower 10 on the outer circumference of the turntable 11, thereby drives the turntable 11 to rotate and be positioned at a preset position. Please refer to FIG. 2, which is so-called the driving mode of the barrel cam, the roller follower 20 is provided on the disk surface of the turntable 21, and the central axis of each of the roller follower 20 is parallel to the central axis of the turntable 21. The barrel cam 22 drives the roller follower 20 on the disk surface of the turntable 21, thereby drives the turntable 21 to rotate and be positioned at a preset position.

However, whether the roller gear cam or the barrel cam drives the driven roller of the turntable, the roller follower can only contact the rib wall on one side of the cam groove and make a rolling contact. There must be a gap between the cam groove of the roller gear cam or the barrel cam and the roller followers. When the turntable is driven, a so-called backlash is formed between the roller follower and the rib wall on the other side of the cam groove. Generally, the backlash is about 0.1 mm. Please refer to FIG. 2, as for the barrel cam, the roller follower 20 on the disk surface of the turntable 21 must contact on at least one side of the cam groove 221 of the barrel cam 22, and the roller follower 20 must also be rotatable in the cam groove 221.

Figure 3:
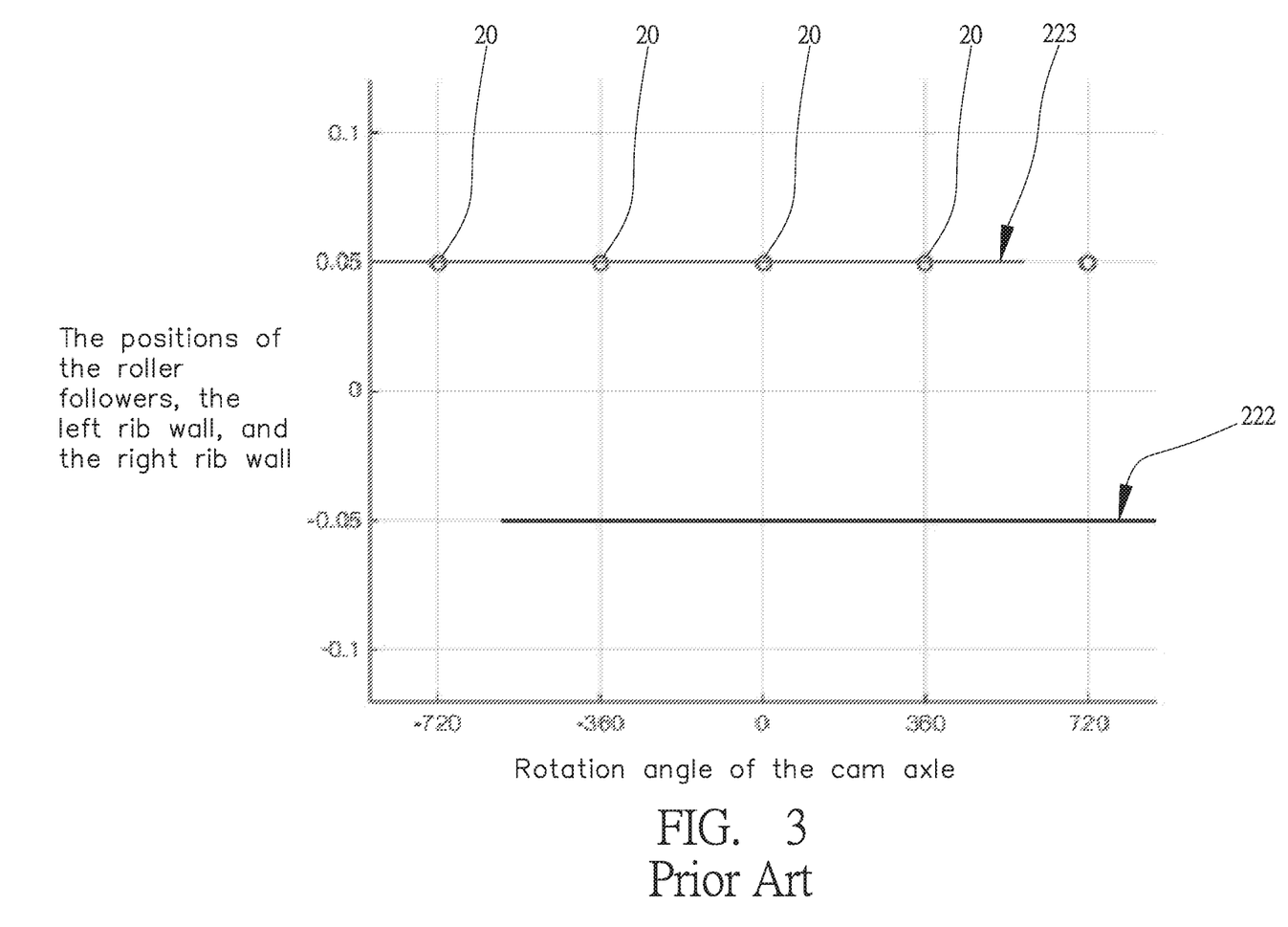
FIG. 3: Shows the relative positional relationship diagram about the roller followers and the left and right rib walls of the barrel cam when the barrel cam of FIG. 2 is rotated counterclockwise.
Figure 4:
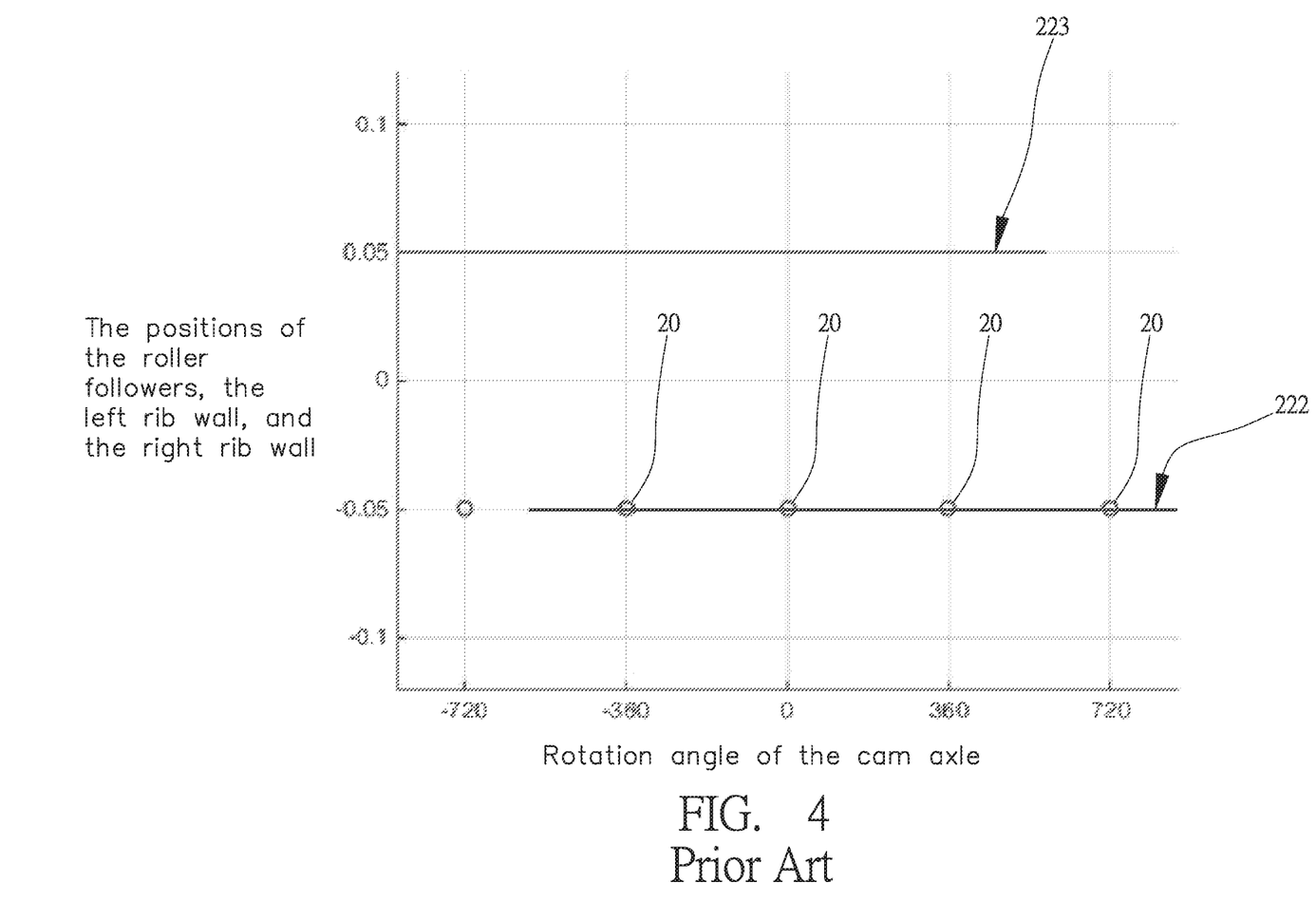
FIG. 4: Shows the relative positional relationship diagram about the roller followers and the left and right rib walls of the barrel cam when the barrel cam of FIG. 2 is rotated clockwise.

Therefore, the groove width of the cam groove 221 of the barrel cam 22 must be slightly larger than the outer diameter of the roller follower 20 for the rotation of the roller follower 20, and the cam groove 221 is manufactured with the equal groove width. Therefore, when the roller follower 20 is guided in the cam groove 221, a gap is formed between one of the rib walls 222, 223 and the roller follower 20. Please refer to FIG. 3, when the barrel cam 22 rotates counterclockwise (CCW), the right rib wall 223 will contact and compress the roller follower 20 to drive the turntable 21 to rotate clockwise (CW), and a backlash with 0.1 mm width is formed between the roller follower 20 and the left rib wall 222 of the barrel cam 22. In contrast, please refer to FIG. 4, when the barrel cam 22 rotates clockwise (CW), the left rib wall 222 of the barrel cam 22 will contact and compress to the roller follower 20 to rotate the turntable 21 counterclockwise (CCW). A backlash with 0.1 mm width is formed between the roller follower 20 and the right rib wall 223. The existence of the backlash mentioned above not only causes the shock and the vibration between one of the rib walls and the roller follower when the barrel cam is started forward or backward, but also affects the positioning accuracy of the indexing rotation of the turntable and the machining accuracy of the workpiece. Therefore, the manufacturer is working to eliminate the backlash, but the existing problem of backlash cannot be effectively solved.

In view of this, the inventor has been engaged in research and development and production of related industries for many years, and has conducted in-depth research on the problems currently faced. After long-term efforts and research, the inventor has finally developed an effective elimination the problem of backlash between the cam component and the roller followers. The shortcomings of the prior art are improved effectively, which is the design tenet of the present invention.

SUMMARY OF THE INVENTION

The first object of the present invention is to provide an indexing device which is provided with a plurality of roller followers arranged at equal angular intervals on the turntable; a cam component is provided on one side of the turntable. The cam component is provided with a first side rib wall with a continuous cam curved surface in a first direction and a second side rib wall with a continuous cam curved surface in a second direction, and the first side rib wall and the second side rib wall face opposite sides to form a cam groove with a variable groove width for guiding the movements of the roller followers and rotating the turntable; wherein the first side rib wall and the second side rib wall can compress on at least one pair of the roller followers of the turntable symmetrically in the first and second directions, so as to effectively eliminate the backlash problem between the cam component and the roller followers.

The second object of the present invention is to provide an indexing device, wherein the first side rib wall and the second side rib wall can compress on at least one pair of the roller followers symmetrically in the first and second directions. Therefore, the backlash between the cam component and the roller followers can be eliminated, and the shock and the vibration between the cam component and each roller follower can be effectively avoided whether in the forward or reverse start or stop, thereby effectively reducing the noise and the vibration during the transmission.

The third object of the present invention is to provide an indexing device, wherein the first side rib wall and the second side rib wall can compress on at least one pair of the roller followers of the turntable symmetrically in the first and second directions. Therefore, the backlash between the cam component and the roller followers can be eliminated, and the turntable can be accurately positioned at the preset position, thereby effectively improving the positioning accuracy of the turntable.

The fourth object of the present invention is to provide an indexing device, wherein the first side rib wall and the second side rib wall can compress on at least one pair of the roller followers symmetrically in the first and second directions. Therefore, the backlash between the cam component and the roller followers can be eliminated, and the turntable can be accurately positioned at the preset position, thereby effectively improving the machining accuracy of the working piece.

DETAILED DESCRIPTION OF THE INVENTION

Figure 5:
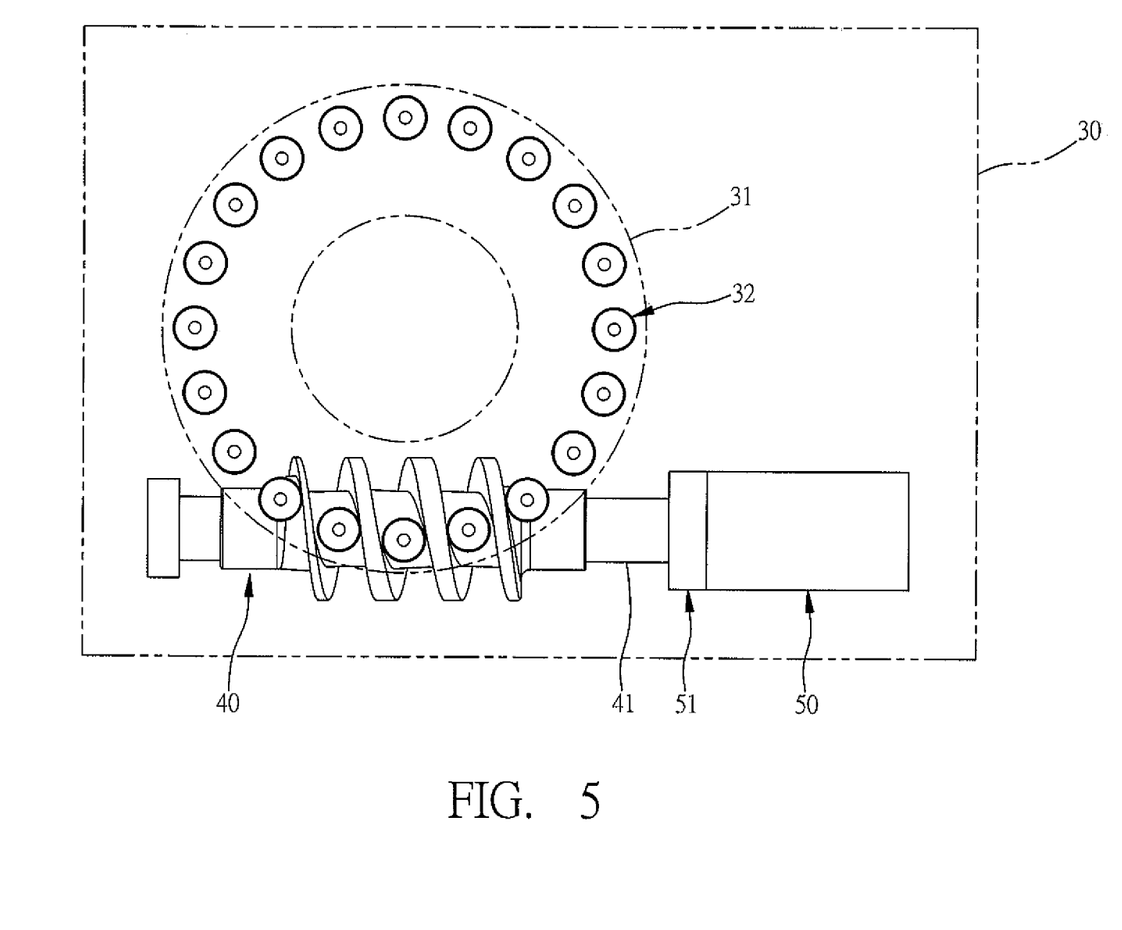
FIG. 5: Schematic diagram of the structure of the present invention.

In order to let the reviewer further understand the present invention, the preferred embodiment will be described in detail as the following description:

Please refer to FIG. 5, the driving mode of the present invention can be the roller gear cam or the barrel cam; in one of the embodiments of the present invention, the barrel cam is used as the driving mode for description; in the driving mode of the barrel cam, the turntable 31 is provided on a machine base 30, the turntable 31 is rotatable on the machine base 30, the turntable 31 has a plurality of roller followers 32 arranged at equal angular intervals.

In one of the embodiments of the present invention, the turntable 31 has 20 roller followers 32 arranged at equal angular intervals. The central axis of each of the roller followers is parallel to the central axis of the turntable. A cam component 40 is provided on one side of the turntable 31. In one of the embodiments of the present invention, the cam component 40 is a barrel cam, wherein the cam component 40 has a cam axle 41, and one end of the cam axle 41 is connected to a driving source 50 to drive the cam component 40 to rotate. The driving source 50 is connected to a reducer 51, and the reducer is driveably connected to the cam axle 41 of the cam component 40.

Figure 6:
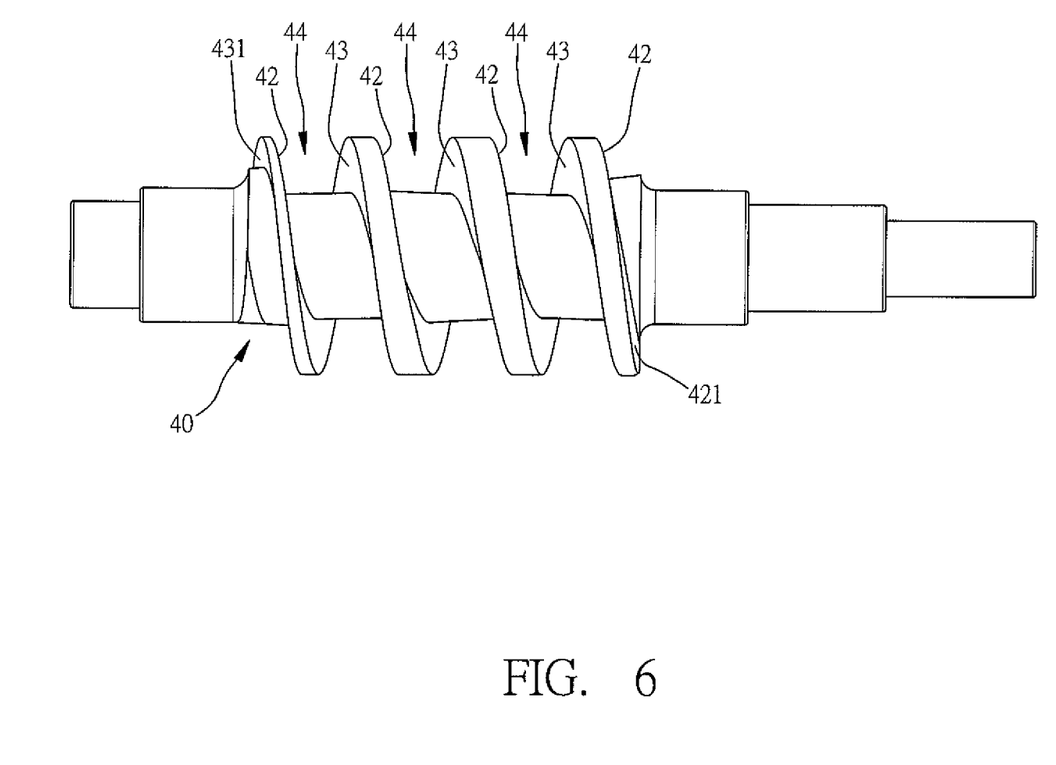
FIG. 6: Schematic diagram of the cam component in the present invention.

Please refer to FIG. 6, the cam component 40 is provided with a first side rib wall 42 with a continuous cam curved surface in a first direction and a second side rib wall 43 with a continuous cam curved surface in a second direction, and the first side rib wall 42 and the second side rib wall 43 face opposite sides to form a cam groove with "a variable groove width" for guiding the movements of the roller followers 32 and rotating the turntable 31; Besides, the leading ends of the first side rib wall 42 and the second side rib wall 43 of the cam component extend with the progressive guiding cam curved surfaces 421, 431 for progressively guiding the movements of the roller followers 32 smoothly. In one of the embodiments of the present invention, the cam component 40 is designed according to various conditions, and the cam component 40 is provided with the first side rib wall 42 with the continuous cam curved surface in the first direction (from right to left) formed by machining, and the cam component 40 is provided with the second side rib wall 43 with the continuous cam curved surface in the second direction (from left to right) formed by machining. Therefore, the cam component 40 has a cam groove 44 with "the variable groove width". That is, the conventional technology first constructs the cam groove, and the first side rib wall and the second side rib wall are naturally formed on the two sides of the cam groove, so that the "equal groove width" of cam groove is obtained. However, the invention first constructs the continuous cam curved surfaces of the first side rib wall 42 and the second side rib wall 43, so that the cam groove with "the variable groove width" can be obtained between the first side rib wall 42 and the second side rib wall 43.

Figure 7:
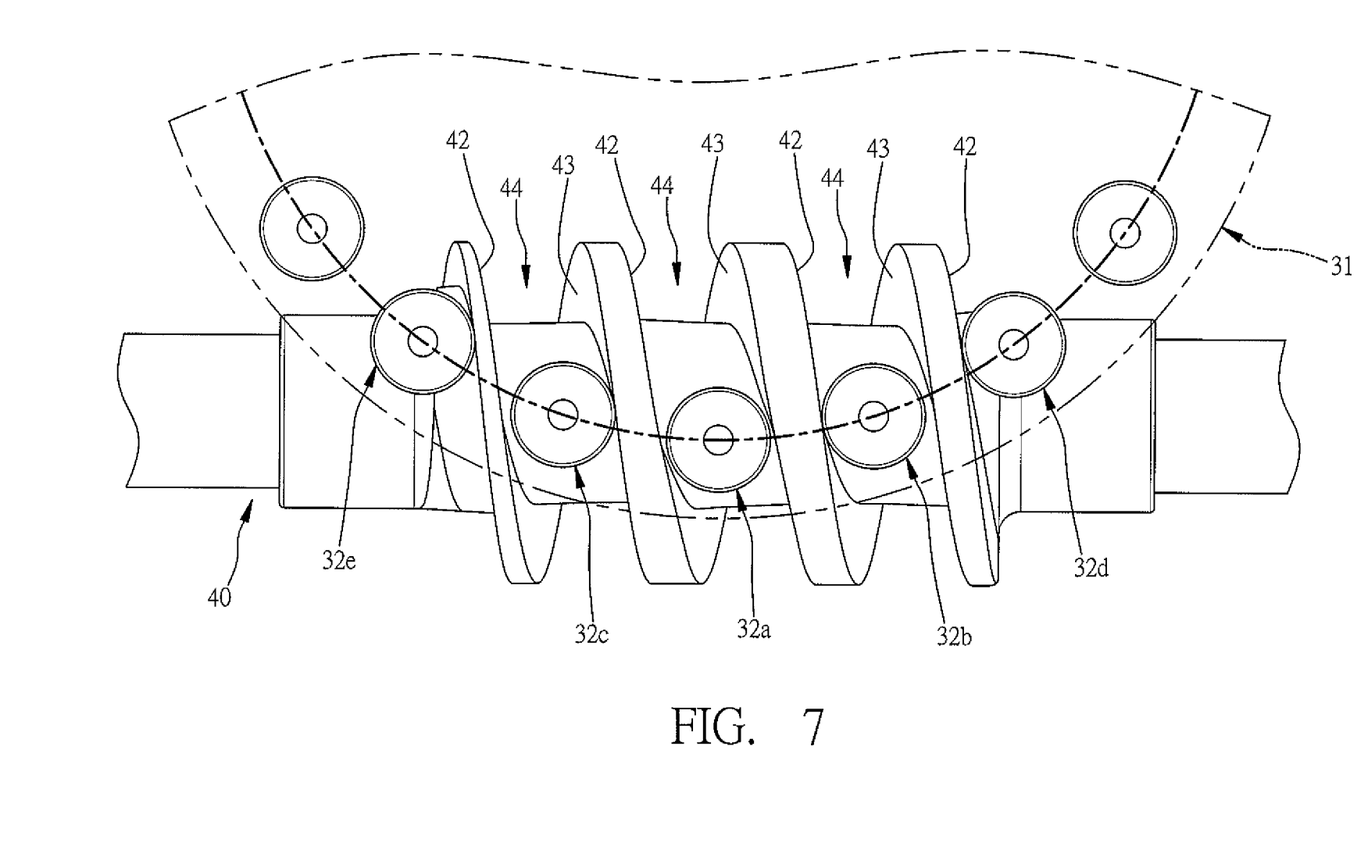
FIG. 7: Schematic view showing the roller follower guided in the cam component of the present invention.

Please refer to FIG. 7, when the roller followers 32 of the turntable 31 are guided in the cam groove 44 of the cam component 40, the first side rib wall 42 and the second side rib wall 43 compress on at least one pair of the roller followers of the turntable 31 symmetrically in the first and second directions since the cam groove 44 is designed to be "the variable groove width". In one embodiment of the present invention, the first side rib wall 42 and the second side rib wall 43 compress on the first pair of roller followers 32b, 32c and the second pair of roller followers 32d, 32e symmetrically in the first and second directions. The roller follower 32a does not contact with the first side rib wall 42 and the second side rib wall 43. Please refer to FIG. 8 for the relative positional relationship between the roller followers 32a, 32b, 32c, 32d, 32e, the first side rib wall 42, and the second side rib wall 43. The A1 section represents the compression zone of the first side rib wall 42, the A2 section represents the progressive guiding zone of the first side rib wall 42, and the B1 section represents the compression zone of the second side rib wall 43. The B2 section indicates the progressive guiding zone of the second side rib wall 43, and the C section indicates the compression reversing zone.

Figure 8:
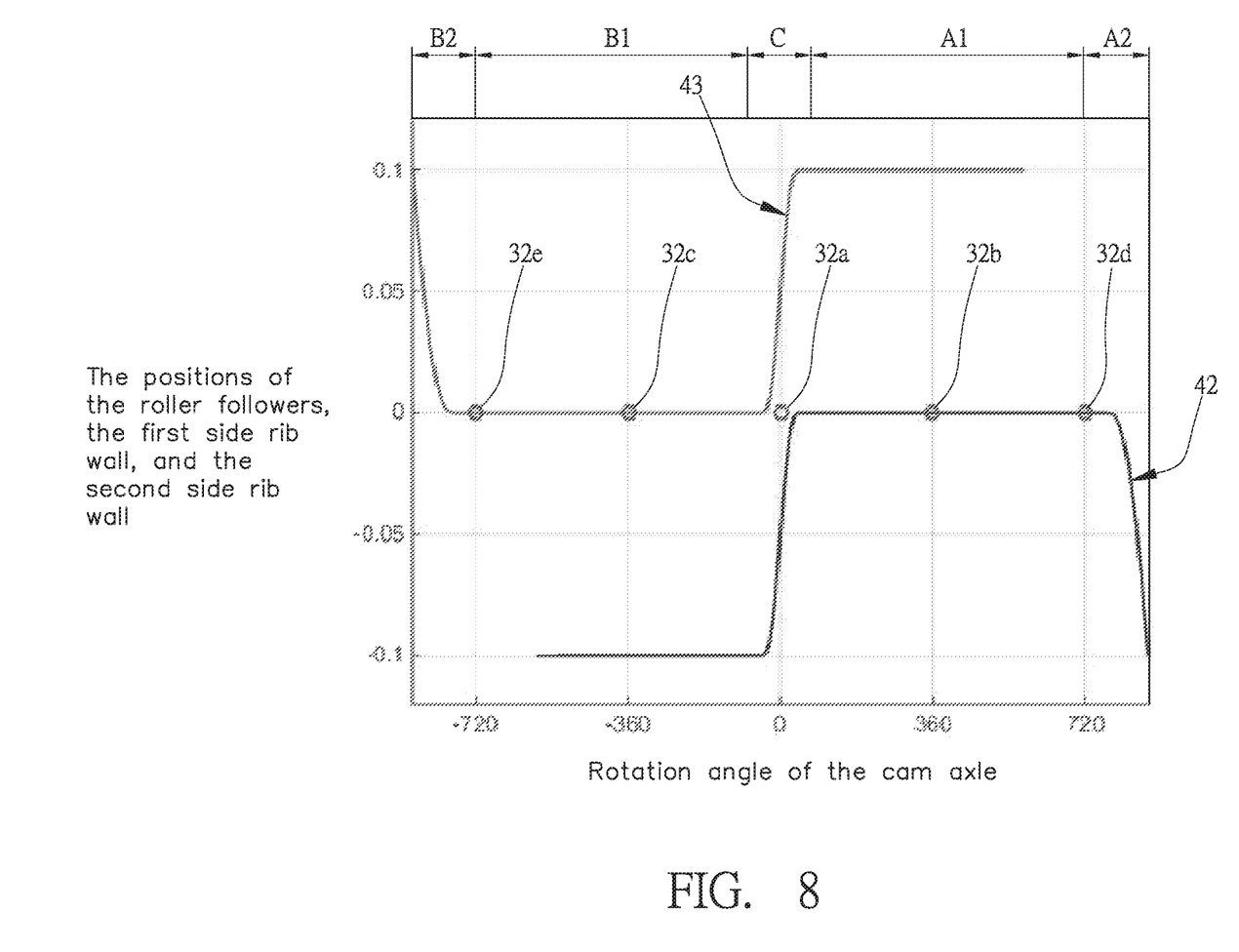
FIG. 8: Schematic diagram shows the relative positional relationship between each of the roller followers and the first and second side rib walls of the cam component in FIG. 7.

In the present invention, since the cam groove 44 has a design of "the variable groove width", it can be found from the relative positional relationship diagram that the roller follower 32a located in the C section does not contact the first side rib wall 42 and the second side rib wall 43. Furthermore, the roller follower 32b and the roller follower 32d are located in the A1 section, and no gap is formed between the roller followers 32b,32d and the first side rib wall 42; that is, the roller follower 32b and the roller follower 32d are in contact with the first side rib wall 42, and are compressed by the first side rib wall 42. As for the roller follower 32c and the roller follower 32e fall in the B1 section, and no gap is formed between the roller followers 32c,32e and the second side rib wall 43; that is, the roller follower 32c and the roller follower 32e are in contact with the second side rib wall 43 and are compressed by the second side rib wall 43. Therefore, the first side rib wall 42 and the second side rib wall 43 can symmetrically compress on the first pair of the roller followers 32b, 32c and the second pair of the roller followers 32d, 32e in the first and second directions respectively.

Figure 9:
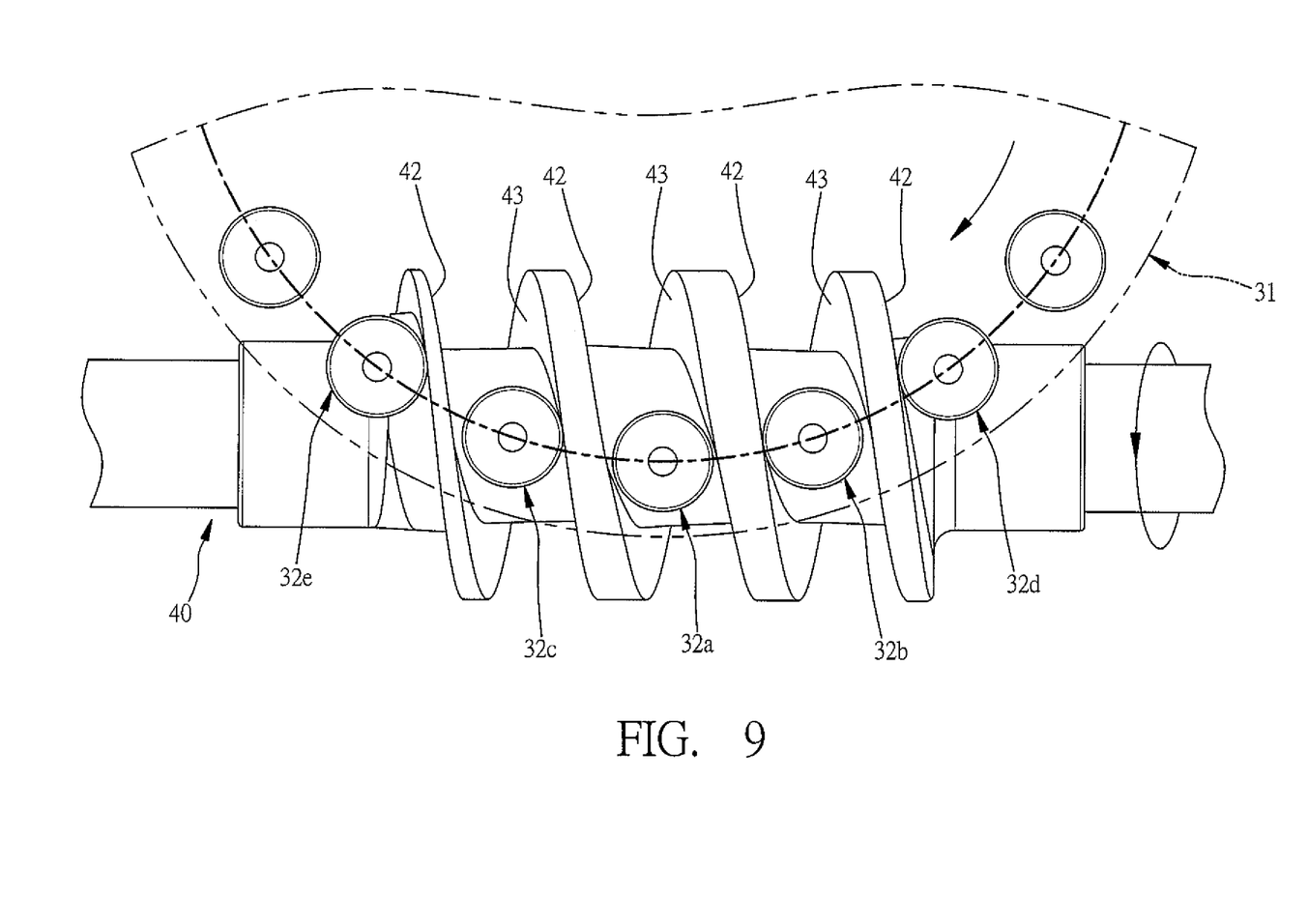
FIG. 9: Schematic diagram shows the counterclockwise rotation of the cam component of the present invention.

Please refer to FIG. 9, when the cam component 40 is rotated counterclockwise (CCW), the second side rib wall 43 compresses on the roller follower 32c and the roller follower 32e. Therefore, the second side rib wall 43 of the cam component 40 can immediately move the roller follower 32c and the roller follower 32e to drive the turntable 31 to rotate clockwise (CW), and the impact between the cam component 40 and each of the roller followers can be effectively avoided, thereby effectively reducing the noise and the vibration during the transmission. Please refer to FIGS. 10 and 11, after the cam component 40 is rotated 360 degrees counterclockwise (CCW), the guiding cam curved surface 431 of the leading end of the second side rib wall 43 of the cam component 40 can progressively guide the roller follower 32e away from the B2 section. The roller followers 32c, 32a are compressed by the second side rib wall 43 in the B1 section. Meanwhile, the rotation of the turntable 31 moves the roller follower 32b to the C section, and the roller follower 32b does not contact with the first side rib wall 42 and the second side rib wall 43. The roller follower 32d is maintained in the A1 section. The guiding cam curved surface 421 of the leading end of the first side rib wall 42 progressively guides the roller follower 32f into the A2 section and then the roller follower 32f enters the A1 section, and the roller follower 32f is in contact with the first side rib wall 42 in the A1 section. The first side rib wall 42 and the second side rib wall 43 can symmetrically compress on the first pair of the roller followers 32d, 32a and the second pair of the roller followers 32f, 32c in the first and second directions. Therefore, when the cam component 40 stops rotating, the roller followers 32d, 32f simultaneously cause the turntable 31 to stop rotating immediately, so that the turntable 31 is accurately positioned at the preset indexing position.

Figure 10:
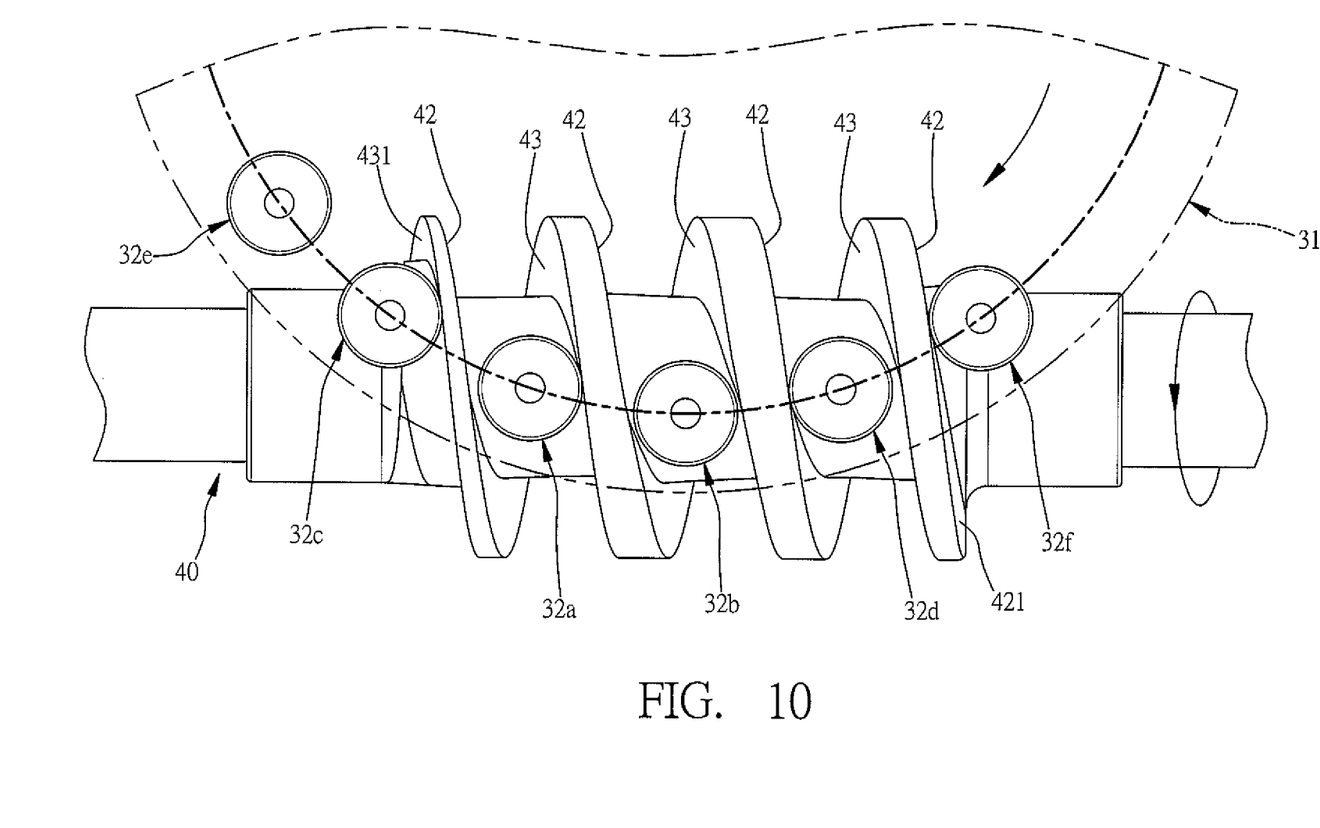
FIG. 10: Schematic diagram shows the cam component of the present invention rotated 360 degrees counterclockwise.
Figure 11:
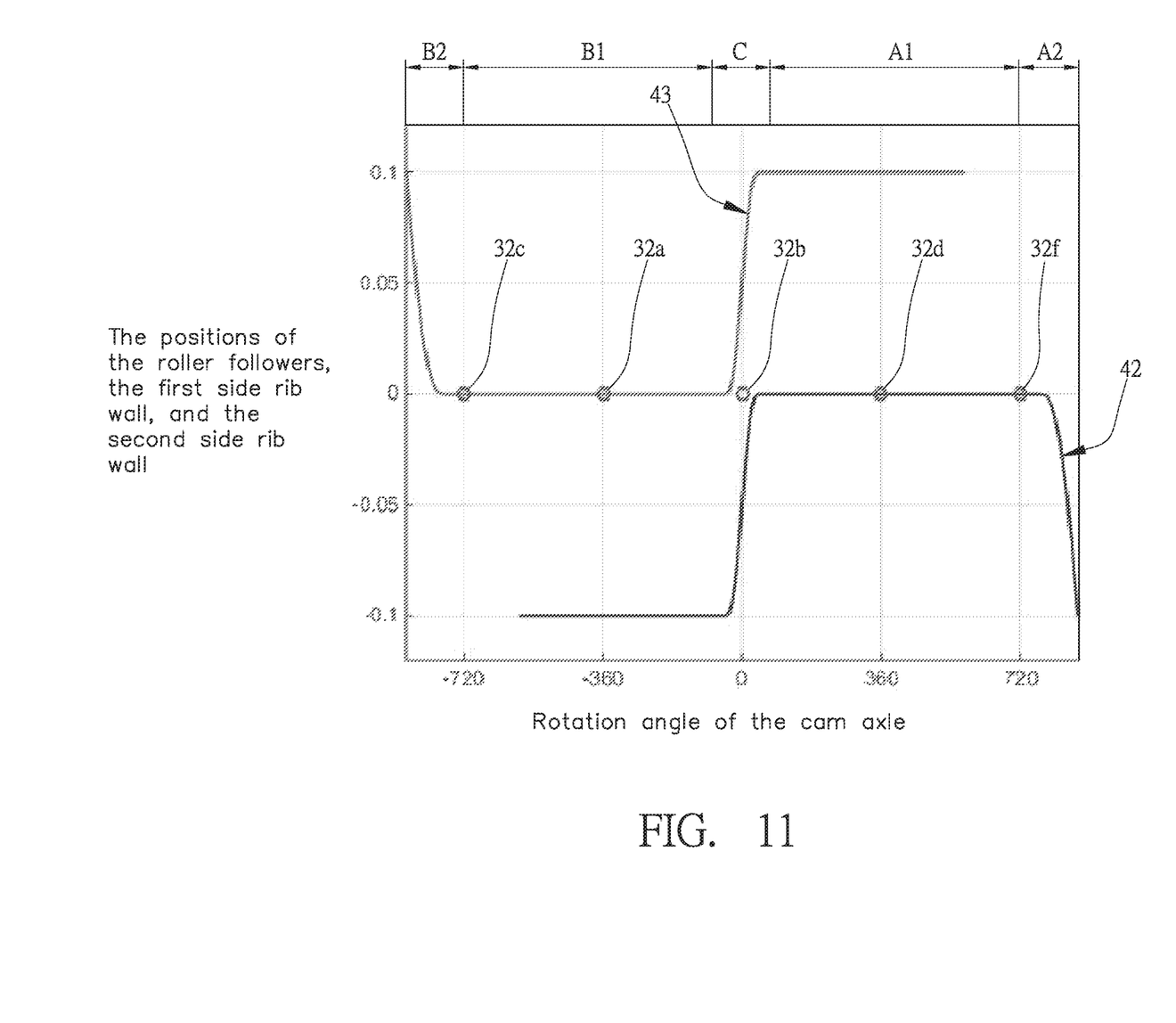
FIG. 11: Schematic diagram shows the relative positional relationship between each of the roller followers and the first and second side rib walls of the cam component in FIG. 10.
Figure 12:
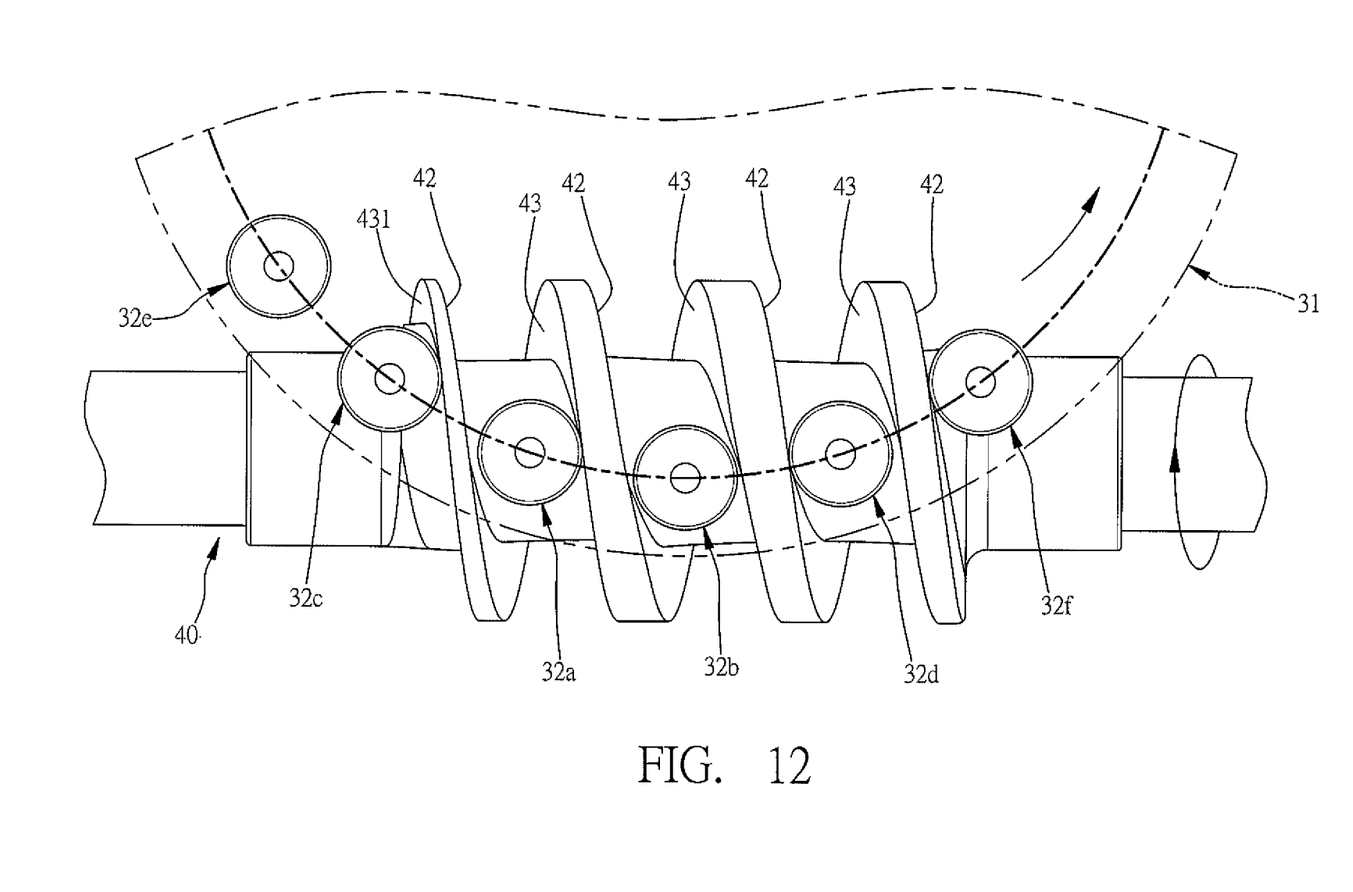
FIG. 12: Schematic diagram shows the clockwise rotation of the cam component of the present invention.
Figure 13:
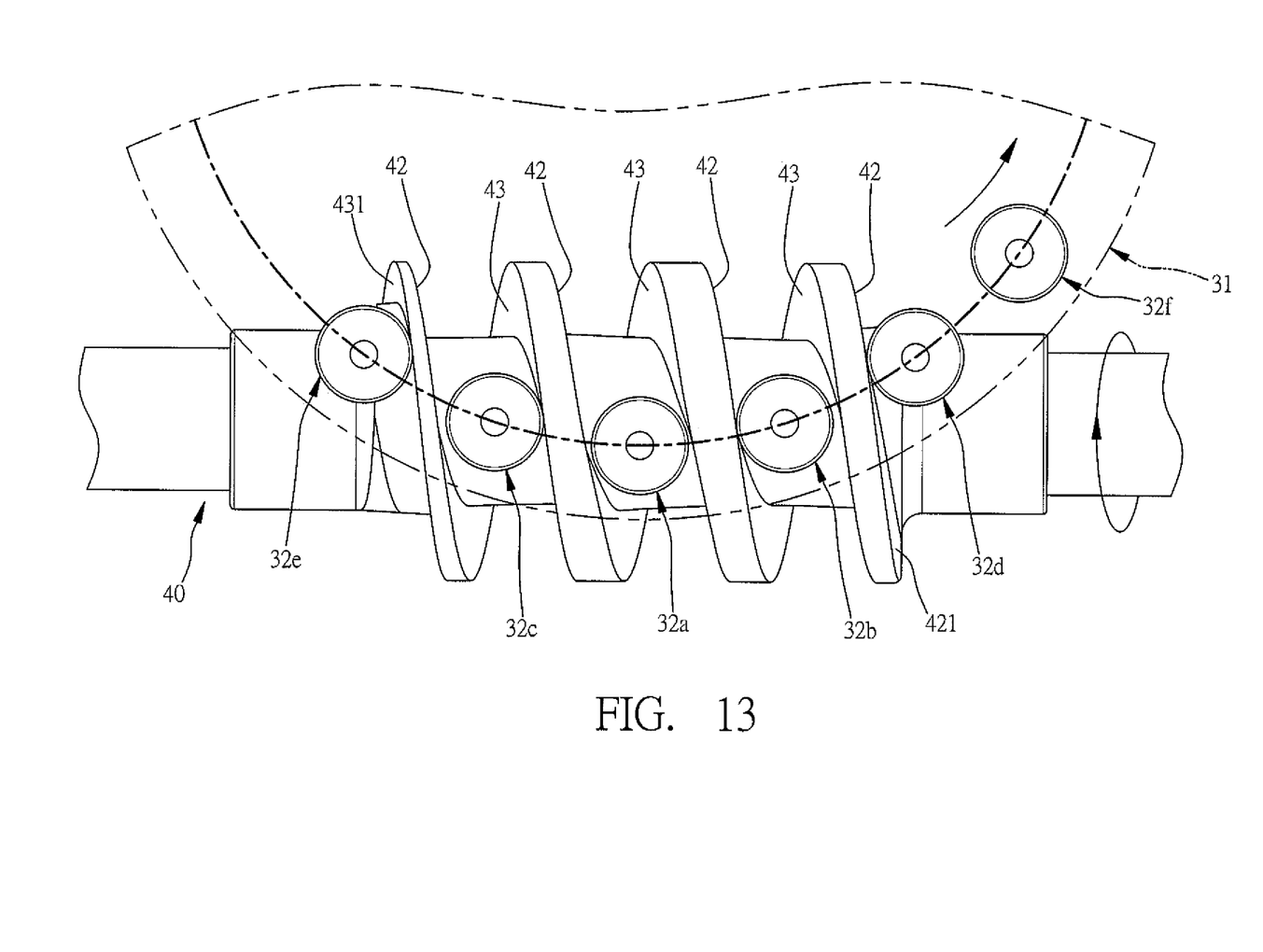
FIG. 13: Schematic diagram shows the cam component of the present invention rotated 360 degrees clockwise.
Figure 14:
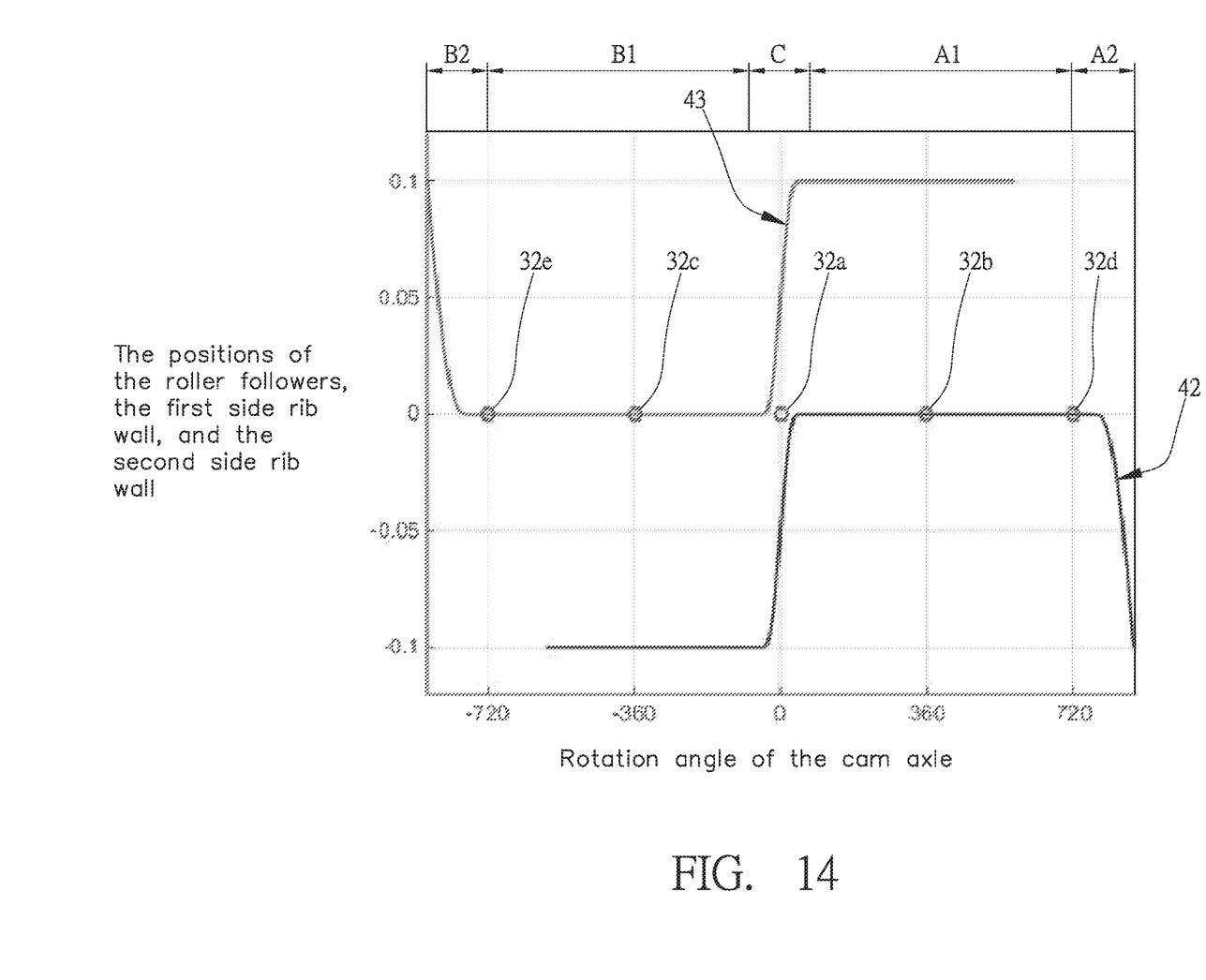
FIG. 14: Schematic diagram shows the relative positional relationship between each of the roller followers and the first and second side rib walls of the cam component in FIG. 13.

Please refer to FIG. 12, which is continued from the state of FIG. 10, when the cam component 40 is rotated clockwise (CW), the first side rib wall 42 compresses on the roller follower 32d and the roller follower 32f. Therefore, the first side rib wall 42 of the cam component 40 can immediately move the roller follower 32d and the roller follower 32f to drive the turntable 31 to rotate counterclockwise (CCW), and the impact between the cam component 40 and each of the roller followers can be effectively avoided, thereby effectively reducing the noise and the vibration during the transmission. Please refer to FIGS. 13 and 14, after the cam component 40 is rotated 360 degrees clockwise (CCW), the guiding cam curved surface 421 of the leading end of the first side rib wall 42 of the cam component 40 can progressively guides the roller follower 32f away from the A2 section. The roller followers 32b, 32d are compressed by the first side rib wall 42 in the A1 section. Meanwhile, the rotation of the turntable 31 moves the roller follower 32a to the C section, and the roller follower 32a does not contact with the first side rib wall 42 and the second side rib wall 43. The roller follower 32c is maintained in the B1 section. The guiding cam curved surface 431 of the leading end of the second side rib wall 43 progressively guides the roller follower 32e into the B2 section and then the roller follower 32e enters the B1 section, and the roller follower 32e is in contact with the second side rib wall 43 in the B1 section. The first side rib wall 42 and the second side rib wall 43 can symmetrically compress on the first pair of the roller followers 32b, 32c and the second pair of the roller followers 32d, 32e in the first and second directions. Therefore, when the cam component 40 stops rotating, the roller followers 32c, 32e simultaneously cause the turntable 31 to stop rotating immediately, so that the turntable 31 is accurately positioned at the preset indexing position.

According to the above description, the cam component provides the design of the cam groove with "the variable groove width". Therefore, the cam component can compress on at least one pair of the roller followers by the first side rib wall with a continuous cam curved surface in a first direction and on the second side rib wall with a continuous cam curved surface in a second direction, so as to keep no backlash between the first side rib wall, the second side rib wall and at least one pair of the roller followers. The cam component can be started forward or backward or be stopped at any angular position without causing the impact between the rib walls and the roller followers, which not only makes the turntable accurately located at the preset indexing position but also ensures the machining accuracy of the workpiece on the turntable.

Accordingly, the present invention is a practical and progressive design, and the same products and publications have not been disclosed, thereby the invention being in compliance with the requirements of patent application and being applied in accordance with the law.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. An indexing device, comprising:
   a machine base;
   a turntable, provided on the machine base, the turntable having a plurality of roller followers arranged at equal angular intervals; and
   a cam component, provided on one side of the turntable, the cam component having a first side rib wall with a continuous cam curved surface in a first direction and a second side rib wall with a continuous cam curved surface in a second direction, the first side rib wall and the second side rib wall facing opposite sides to form a cam groove with a variable groove width for guiding the movements of the plurality of roller followers and rotating the turntable;
   wherein the first side rib wall and the second side rib wall compress on at least one pair of the roller followers of the turntable symmetrically along the first and the second directions, one of a pair of the plurality of roller followers is compressed by the first side rib wall without contacting the second side rib wall, the other one of the pair of the plurality of roller followers is compressed by the second side rib wall without contacting the first side rib wall.

2. The indexing device according of claim 1, wherein the turntable is provided with the plurality of roller followers on a turntable surface, and a central axis of the plurality of roller followers are parallel to a central axis of the turntable, and the cam component is a barrel cam.

3. The indexing device according of claim 1, wherein the cam component has a cam axle, one end of the cam axle is connected to a driving source to drive the cam component to rotate.

4. The indexing device according of claim 3, wherein the driving source is connected to a reducer, the reducer is driveably connected to the cam axle of the cam component.

5. The indexing device according to claim 1, wherein the cam component is provided with the first side rib wall with the continuous cam curved surface in the first direction formed by machining, and the second side rib wall with the continuous cam curved surface in the second direction formed by machining.

* * * * *